United States Patent
Bailey et al.

(10) Patent No.: US 8,386,618 B2
(45) Date of Patent: Feb. 26, 2013

(54) SYSTEM AND METHOD FOR FACILITATING WIRELESS COMMUNICATION DURING A PRE-BOOT PHASE OF A COMPUTING DEVICE

(75) Inventors: Abdul M. Bailey, Tigard, OR (US); Di Tang, Shanghai (CN); Rahul Khanna, Portland, OR (US); Vincent J. Zimmer, Federal Way, WA (US); Kevin Y. Li, Shanghai (CN); James W. Edwards, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 337 days.

(21) Appl. No.: 12/889,583

(22) Filed: Sep. 24, 2010

(65) Prior Publication Data

US 2012/0079118 A1 Mar. 29, 2012

(51) Int. Cl.
*G06F 15/16* (2006.01)
*G06F 15/177* (2006.01)
*G06F 15/173* (2006.01)

(52) U.S. Cl. ......... 709/227; 709/217; 709/220; 709/223
(58) Field of Classification Search .................... 709/227
See application file for complete search history.

(56) References Cited

U.S. PATENT DOCUMENTS

| | | | |
|---|---|---|---|
| 5,918,048 A | 6/1999 | Mealey et al. | |
| 5,944,821 A | 8/1999 | Angelo | |
| 5,974,547 A | 10/1999 | Klimenko | |
| 5,991,822 A | 11/1999 | Mealey et al. | |
| 6,128,732 A | 10/2000 | Chaiken | |
| 6,219,828 B1 | 4/2001 | Lee | |
| 6,253,320 B1 | 6/2001 | Sekiguchi et al. | |
| 6,587,951 B1 | 7/2003 | Flanigan | |
| 6,615,288 B1 | 9/2003 | Herzi | |
| 6,745,296 B2 | 6/2004 | Chong | |
| 6,775,734 B2 | 8/2004 | Chang | |
| 6,857,041 B2 | 2/2005 | LeClerg | |
| 6,889,340 B1 | 5/2005 | Bramley, Jr. | |
| 7,082,542 B2 | 7/2006 | Cooper | |
| 7,103,529 B2 | 9/2006 | Zimmer | |
| 7,134,125 B2 | 11/2006 | Rothman et al. | |
| 7,136,994 B2 | 11/2006 | Zimmer et al. | |
| 7,159,105 B2 | 1/2007 | Rothman et al. | |
| 7,165,170 B2 | 1/2007 | Rothman et al. | |
| 7,181,610 B2 | 2/2007 | Zimmer et al. | |
| 7,185,190 B2 | 2/2007 | Rothman et al. | |
| 7,188,262 B2 | 3/2007 | Arends et al. | |

(Continued)

OTHER PUBLICATIONS

"Extensible Firmware Interface", Wikipedia, The Free Encyclopedia, retreived on Apr. 13, 2011, Webpage available at: <http://en.wikipedia.org/wiki/UEFI>.

(Continued)

*Primary Examiner* — Wing F Chan
*Assistant Examiner* — David X Yi
(74) *Attorney, Agent, or Firm* — Barnes & Thornburg LLP (57) ABSTRACT

A system, device, and method for facilitating wireless communications during a pre-boot phase of a computing device includes establishing a communications interface between a unified extensible firmware interface executed on the computing device and a wireless transceiver of the computing device during a pre-boot phase of the computing device. An OOB processor of the computing device processes data communications between the unified extensible firmware interface and the wireless communication circuit during the pre-boot phase by reformatting the data communications between wired and wireless communication standards.

18 Claims, 5 Drawing Sheets

U.S. PATENT DOCUMENTS

| | | |
|---|---|---|
| 7,231,512 B2 | 6/2007 | Rothman et al. |
| 7,269,768 B2 | 9/2007 | Rothman et al. |
| 7,275,152 B2 | 9/2007 | Goud et al. |
| 7,284,136 B2 | 10/2007 | Zimmer et al. |
| 7,310,725 B2 | 12/2007 | Zimmer et al. |
| 7,320,052 B2 | 1/2008 | Zimmer et al. |
| 7,383,450 B2 | 6/2008 | Rothman et al. |
| 7,451,301 B2 | 11/2008 | Zimmer et al. |
| 7,478,141 B2 | 1/2009 | Rothman et al. |
| 7,543,048 B2 | 6/2009 | Rothman et al. |
| 7,549,055 B2 | 6/2009 | Zimmer et al. |
| 7,577,575 B1 | 8/2009 | Donner et al. |
| 7,587,750 B2 | 9/2009 | Zimmer et al. |
| 7,730,205 B2 | 6/2010 | Rothman et al. |
| 7,827,371 B2 | 11/2010 | Yao et al. |
| 7,865,775 B2 * | 1/2011 | Yao et al. ............... 714/36 |
| 2001/0016892 A1 | 8/2001 | Klein |
| 2003/0093579 A1 | 5/2003 | Zimmer et al. |
| 2004/0034764 A1 | 2/2004 | Bulusu et al. |
| 2004/0230963 A1 | 11/2004 | Rothman et al. |
| 2004/0255106 A1 | 12/2004 | Rothman et al. |
| 2005/0015430 A1 | 1/2005 | Rothman et al. |
| 2005/0021968 A1 | 1/2005 | Zimmer et al. |
| 2005/0044363 A1 | 2/2005 | Zimmer et al. |
| 2005/0149711 A1 | 7/2005 | Zimmer et al. |
| 2008/0152142 A1 | 6/2008 | Buer et al. |
| 2008/0162809 A1 | 7/2008 | Rothman et al. |
| 2009/0172381 A1 | 7/2009 | Zimmer et al. |
| 2009/0240806 A1 | 9/2009 | Carpelan |
| 2009/0327741 A1 | 12/2009 | Zimmer et al. |

OTHER PUBLICATIONS

"Intel Active Management Technology", Wikipedia, The Free Encyclopedia, retreived on Apr. 13, 2011, Webpage available at: <http://en.wikipedia.org/wiki/Intel_Active_Management_Technology>.

Hewlett-Packard Corp., et al., "Advanced Configuration and Power Interface Specification", Revision 3.0 B, Oct. 10, 2006, 631 pages.

International Search Report received for International App. No. PCT/US2011/053225, mailed Apr. 25, 2012, 3 pages.

* cited by examiner

SYSTEM AND METHOD FOR FACILITATING WIRELESS COMMUNICATION DURING A PRE-BOOT PHASE OF A COMPUTING DEVICE

BACKGROUND

Many computing devices utilize a software interface between an operating system (OS) executing on the computing device and the platform firmware of the computing device. One example of such a software interface is the Unified Extensible Firmware Interface (UEFI), which is defined by the UEFI Specification version 2.3, published May 8, 2009. The interface defined by the UEFI specification includes data tables that contain platform information, and boot and runtime services, which are available to the operating system loader and the operating system. The UEFI defines boot services, which include text and graphical console support on various devices, bus, block and file services, and runtime services, such as date, time and NVRAM services. The UEFI environment is established prior to the loading of the operating system.

The UEFI specification currently supports wired communications during a pre-boot phase (i.e., prior to the booting of the operating system) of a computing device. However, although the UEFI specification supports the general framework for establishing device drivers for wireless adapters, the UEFI specification currently lacks the comprehensive wireless communication stack to support many of the current wireless technologies. As such, the availability of wireless communication during the pre-boot phase of a computing device is limited.

BRIEF DESCRIPTION OF THE DRAWINGS

The systems, devices, and methods described herein are illustrated by way of example, and not by way of limitation, in the accompanying figures. For simplicity and clarity of illustration, elements illustrated in the figures are not necessarily drawn to scale. For example, the dimensions of some elements may be exaggerated relative to other elements for clarity. In the following figures.

DETAILED DESCRIPTION OF THE DRAWINGS

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention as defined by the appended claims.

In the following description, numerous specific details such as logic implementations, opcodes, means to specify operands, resource partitioning/sharing/duplication implementations, types and interrelationships of system components, and logic partitioning/integration choices may be set forth in order to provide a more thorough understanding of the present disclosure. It will be appreciated, however, by one skilled in the art that embodiments of the disclosure may be practiced without such specific details. In other instances, control structures, gate level circuits, and full software instruction sequences may have not been shown in detail in order not to obscure the disclosure. Those of ordinary skill in the art, with the included descriptions, will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Some embodiments of the disclosure may be implemented in hardware, firmware, software, or any combination thereof. Embodiments of the disclosure implemented in a computer system may include one or more bus-based interconnects between components and/or one or more point-to-point interconnects between components. Embodiments of the invention may also be implemented as instructions stored on a machine-readable, tangible medium, which may be read and executed by one or more processors. A machine-readable, tangible medium may include any tangible mechanism for storing or transmitting information in a form readable by a machine (e.g., a computing device). For example, a machine-readable, tangible medium may include read only memory (ROM); random access memory (RAM); magnetic disk storage media; optical storage media; flash memory devices; and other tangible mediums.

Figure 1:
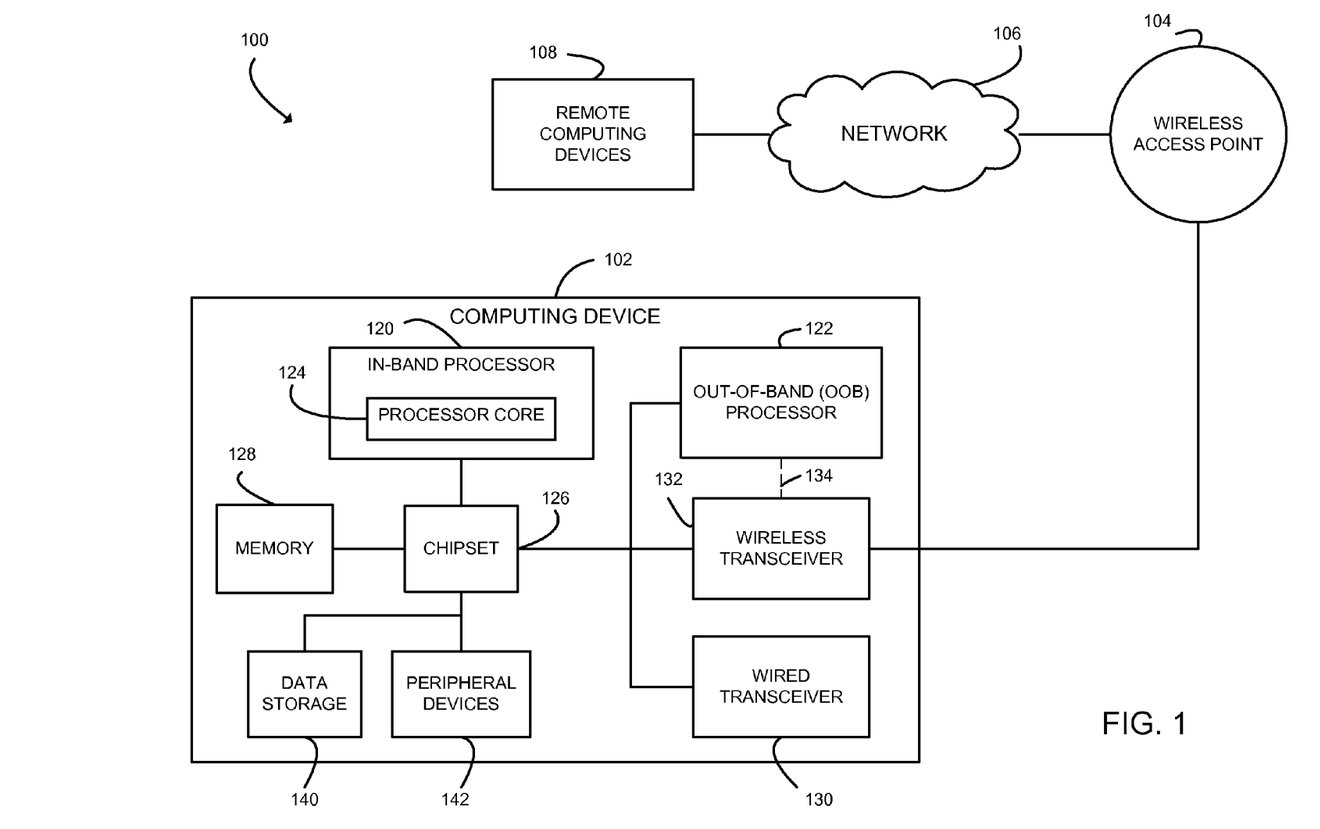
FIG. 1 is a simplified block diagram of one embodiment of a system for facilitating wireless communications during a pre-boot phase of a computing device.

Referring now to FIG. 1, a system 100 for facilitating wireless communications during a pre-boot phase of a computing device includes a computing device 102 and a wireless access point 104. The system 100 may also include an external network 106 and one or more remote computing devices 108. The computing device 102 is communicatively coupled to the wireless access point 104, which is communicatively coupled to the network 106. As discussed below in more detail, the computing device 102 is capable of transmitting and receiving wireless communications during a pre-boot phase via the wireless access point 104.

The computing device 102 may be embodied as any type of electronic device capable of performing the functions described herein. For example, the computing device 102 may be embodied as a personal computer, a workstation, a laptop computer, a handheld computer, a mobile internet device, a cellular phone, a personal data assistant, a telephony device, a network appliance, a virtualization device, a storage controller, or other computer-based device.

In the illustrative embodiment of FIG. 1, the computing device 102 includes an in-band processor 120, an out-of-band (OOB) processor 122, a chipset 126, a memory 128, a wired transceiver 130, and a wireless transceiver 132. In some embodiments, the computing device 102 may also include one or more data storage devices 140 and/or one or more additional peripheral devices 142. In some illustrative embodiments, several of the foregoing components may be incorporated on a motherboard of the computing device 102, while other components may be communicatively coupled to the motherboard via, for example, a peripheral port. Furthermore, it should be appreciated that the computing device 102 may include other components, sub-components, and devices commonly found in a computer and/or computing device, which are not illustrated in FIG. 1 for clarity of the description.

The in-band processor 120 of the computing device 102 may be embodied as any type of processor capable of executing software/firmware, such as a microprocessor, digital signal processor, microcontroller, or the like. The in-band processor 120 is illustratively embodied as a single core processor having a processor core 124. However, in other embodiments, the in-band processor 120 may be embodied as a multi-core processor having multiple processor cores 124. Additionally, the computing device 102 may include additional in-band processors 120 having one or more processor cores 124. The in-band processor 120 is generally responsible for executing a software stack, which may include an operating system and various applications, programs, libraries, and drivers resident on the computing device 102.

The chipset 126 of the computing device 102 may include a memory controller hub (MCH or "northbridge"), an input/output controller hub (ICH or "southbridge"), and a firmware device. In such embodiments, the firmware device may be embodied as a memory storage device for storing Basic Input/Output System (BIOS) data and/or instructions and/or other information. Additionally, in some embodiments, the OOB processor 122 may have access to a secured portion of the firmware memory (e.g., flash memory). Of course, in other embodiments, chipsets having other configurations may be used. For example, in some embodiments, the chipset 126 may be embodied as a platform controller hub (PCH). In such embodiments, the memory controller hub (MCH) may be incorporated in or otherwise associated with the in-band processor 120.

The chipset 126 is communicatively coupled to the in-band processor 120 via a number of signal paths. These signal paths (and other signal paths illustrated in FIG. 1) may be embodied as any type of signal paths capable of facilitating communication between the components of the computing device 102. For example, the signal paths may be embodied as any number of wires, cables, light guides, printed circuit board traces, via, bus, intervening devices, and/or the like.

The memory 128 of the computing device 102 is also communicatively coupled to the chipset 126 via a number of signal paths. The memory 128 may be embodied as one or more memory devices or data storage locations including, for example, dynamic random access memory devices (DRAM), synchronous dynamic random access memory devices (SDRAM), double-data rate synchronous dynamic random access memory device (DDR SDRAM), flash memory devices, and/or other volatile memory devices. Additionally, although only a single memory device 128 is illustrated in FIG. 1, in other embodiments, the computing device 102 may include additional memory devices. The operating system, applications, programs, libraries, and drivers that make up the software stack executed by the in-band processor 120 may reside in memory 128 during execution. Furthermore, software and data stored in memory 128 may be swapped between memory 128 and one or more data storage devices 140 as part of memory management operations.

The wired transceiver 130 of the computing device 102 may be embodied as any number of devices and circuitry for enabling wired communications between the computing device 102 and one or more remote devices (such as remote computing devices 108) over a wired network (i.e., over wired portions of the network 106). For example, the wired transceiver 130 may include one or more wired network interfaces to facilitate wired communications. The wired transceiver 130 is also communicatively coupled to the chipset 126 via a number of signal paths, allowing the in-band processor 120 and the OOB processor 122 to access the wired transceiver 130.

Similar to the wired transceiver 130, the wireless transceiver 132 may be embodied as any number of devices and circuitry for enabling wireless communications between the computing device 102 and the wireless access point 104. For example, the wireless transceiver 132 may include one or more wireless network interfaces to facilitate wireless communications. In some embodiments, the wireless transceiver 132 may be incorporated in or otherwise associated with the OOB processor 122. For example, the wireless transceiver 132 may be communicatively coupled to the OOB processor 122 via a specialized signal path 134 such as a serial peripheral interface bus (SPI Bus), a controller link bus, or other specialized interconnect. In such embodiments, the in-band processor 120 may or may not have access to the wireless transceiver 132. In other embodiments, the wireless transceiver 132 may be communicatively coupled to the chipset 126, allowing the in-band processor 120 and the OOB processor 122 access to the wireless transceiver 132. As discussed in more detail below, the OOB processor 122 is configured to utilize the wireless transceiver 132 during a pre-boot phase of the computing device 102 to provide wireless communication capability to the computing device 102.

The components of the computing device 102, including the in-band processor 120, the chipset 126, the memory 128, and the wired and wireless transceivers 130, 132, are also operably coupled to a power supply (not shown). The power supply may be embodied as a circuit capable of drawing power from either an AC commercial source, a DC battery source, or both. To conserve energy, the computing device 102 may be placed in several reduced-power operational states when not being actively used. For example, the computing device 102 may be placed in a powered down or "off" state in which few, if any, components of computing device 102 receive power from the power supply. Alternatively, the computing device 102 may be placed into various "sleep" or "hibernate" states in which some, but not all, components of computing device 102 receive power from the power supply. For instance, a "sleep" state may provide power to a volatile memory 128 (in order to retain data) but not to the in-band processor 120. Such a reduced-power operational state conserves energy while allowing the computing device 102 to return quickly to a full-power operational state.

The OOB processor 122 is distinct from and generally operates independently of the in-band processor 120. The OOB processor 122 may also be embodied as any type of processor capable of executing software, such as a microprocessor, digital signal processor, microcontroller, or the like, including one or more processors having one or more processor cores (not shown). The OOB processor 122 may be integrated into the chipset 126 on the motherboard or may be embodied as one or more separate integrated circuits disposed on an expansion board that is communicatively coupled to the chipset 126 via a number of signal paths. The OOB processor 122 may also be communicatively coupled to various components of the computing device 102, such as the memory 128 and the wireless transceiver 132 as discussed above. Alternatively or additionally, the OOB processor 122 may include built-in components with similar functionality, such as a dedicated memory and/or dedicated communication circuitry (e.g., the wireless transceiver 132 may be incorporated into the OOB processor 122).

The OOB processor 122 is configured for managing and performing particular functions of the computing device 102 irrespective of the operational state of the in-band processor 120. To facilitate such independent operation, the OOB processor 122 may be provided with an independent connection to the power supply, allowing the OOB processor 122 to retain power even when other components of the computing device 102 are powered down or turned off. Furthermore, the OOB processor 122 may be provided with an independent network interface via the wireless transceiver 132, which is also provided with an independent connection to the power supply, allowing wireless communications via the access point 104 irrespective of the operating state of the the in-band processor 120. In other words, the OOB processor 122 is able to communicate directly with devices on the network 106 (such as remote computing devices 108), outside of the operating system running on in-band processor 120. In fact, this communication may take place without the user's knowledge. In summary, the OOB processor 122 may operate intelligently based on incoming queries/commands and receive and transmit wireless communications via the access point 104 whether the in-band processor 120 is turned off, running on standby, being initialized, or in regular operation and whether the operating system is booting, running, crashed, or otherwise nonfunctioning.

In some illustrative embodiments, the OOB processor 122 may be implemented using Intel® Active Management Technology (Intel® AMT), using a portion of Intel® AMT, using an Intel® Management Engine (Intel® ME), or using Intel® vPro™ Technology (Intel® vPro) all available from Intel Corporation of Santa Clara, Calif., and/or within chipsets sold by Intel Corporation. Intel AMT® embedded platform technology enables out-of-band access to hardware and software information stored in non-volatile memory on each endpoint device, eliminating the need for a functioning operating system and many of the software agents found in other management tools.

As discussed above, the computing device 102 may also include one or more data storage devices 140 and one or more peripheral devices 142. In such embodiments, the chipset 126 is also communicatively coupled to the one or more data storage devices 140 and the one or more peripheral devices 142. The data storage device(s) 140 may be embodied as any type of device or devices configured for the short-term or long-term storage of data such as, for example, memory devices and circuits, memory cards, hard disk drives, solid-state drives, or other data storage devices. The peripheral device(s) 142 may include any number of peripheral devices including input devices, output devices, and other interface devices. For example, the peripheral devices 142 may include a display, mouse, keyboard, and external speakers of the computing device 102. The particular devices included in the peripheral devices 142 may depend upon, for example, the intended use of the computing device 102.

The wireless access point 104 may be embodied as any type of wireless access point capable of facilitating wireless communication between the computing device 102 and the network 106. For example, the wireless access point 104 may be embodied as a wireless router, switch, or hub. The network 106 may be embodied as any type of wired and/or wireless network such as a local area network, a wide area network, a publicly available global network (e.g., the Internet), or other network. Additionally, the network 106 may include any number of additional devices to facilitate communication between the computing device 102 and the remote computing devices 108, such as routers, switches, intervening computers, and the like.

The one or more remote computing devices 108 may be embodied as any type of computing devices separate from the computing device 102. For example, the remote computing devices 108 may be embodied as one or more personal computers, workstations, laptop computers, handheld computers, mobile internet devices, cellular phones, personal data assistants, telephony devices, network appliances, virtualization devices, storage controllers, or other computer-based devices also configured to communicate with the computing device 102 over the network 106. The one or more remote computing devices 108 may each have a similar configuration to that of the computing device 102.

Figure 2:
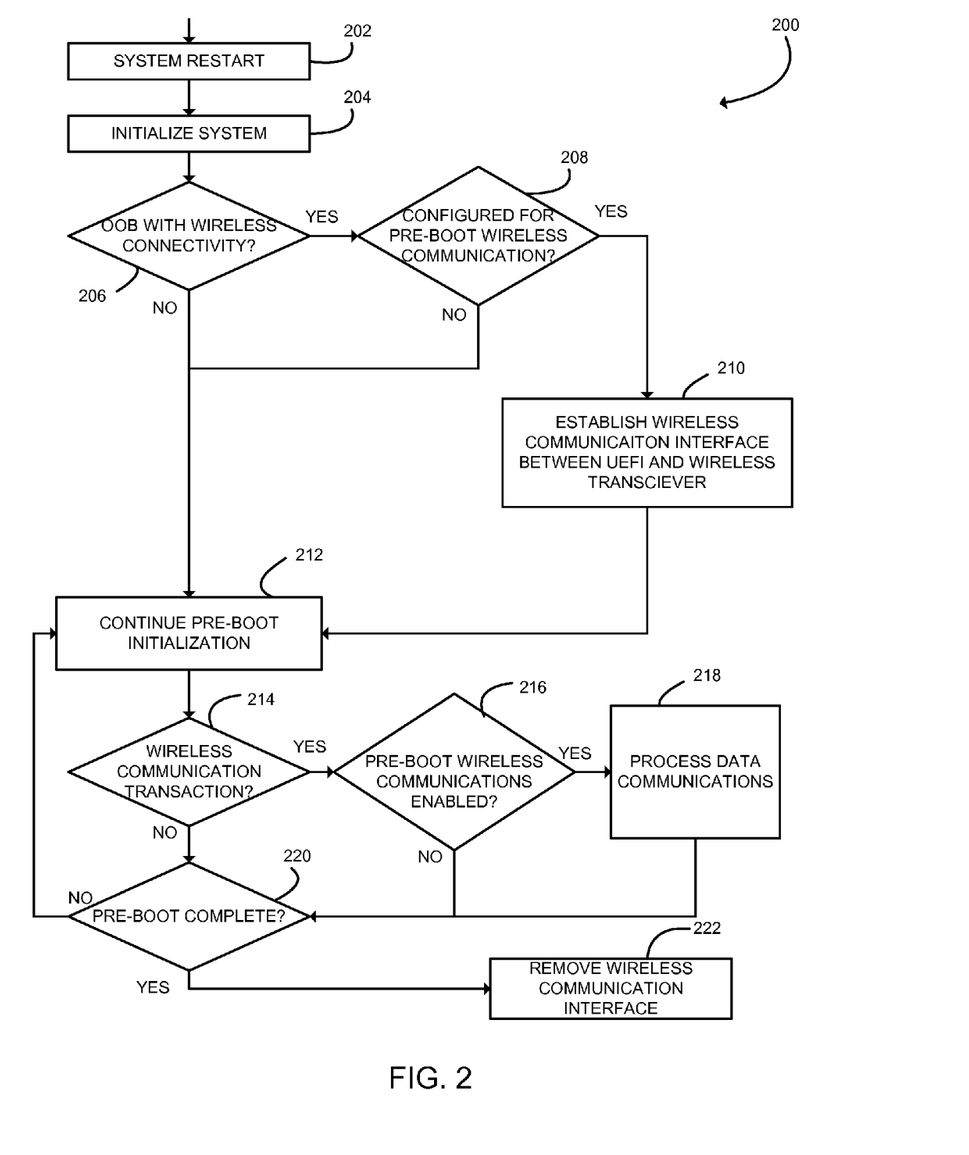
FIG. 2 is a simplified flow diagram of one embodiment of a method for facilitating wireless communications during a pre-boot phase of the computing device of FIG. 1.

As discussed above, the computing device 102 is configured to facilitate wireless communications using the wireless transceiver 132 during a pre-boot phase of the computing device 102. That is, prior to the loading of an operating system on the computing device 102, and irrespective of the operational state of the in-band processor 120, the OOB processor 122 is configured to facilitate data communications between a unified extensible firmware interface (UEFI) and the wireless transceiver 132 to effect wireless communications with the access point 104. To do so, the computing device 102 may execute a method 200 as illustrated in FIG. 2. The method 200 begins with block 202 in which the computing device 102 is restarted or rebooted. That is, the computing device 102 may be powered-on from an off state, rebooted from a sleep state, rebooted from a crash or error state, or the like in block 202. Subsequently, in block 204, the computing device 102 initializes various devices and software elements, such as registers and memory locations. Additionally, the UEFI environment 302 (see FIG. 3) may be initiated in block 204.

In block 206, the computing device 102 determines whether an OOB processor 122 having wireless connectivity to the wireless transceiver 132 is incorporated into the computing device 102. For example, the computing device 102 may determine whether the wireless transceiver 132 is in a powered state irrespective of the operating state of the in-band processor 120. If so, the computing device 102 determines whether the OOB processor 122 is configured for or otherwise supports pre-boot wireless communication in block 208. For example, the computing device 102 may determine whether the OOB processor 122 includes firmware, as discussed below, for facilitating data communications between the UEFI 302 and the wireless transceiver 132. If the computing device 102 determines that no OOB processor 122 is present in block 206 or that an OOB processor 122 is present but is not configured for wireless connectivity in block 208, the method 200 advances to block 212 discussed below.

Figure 3:
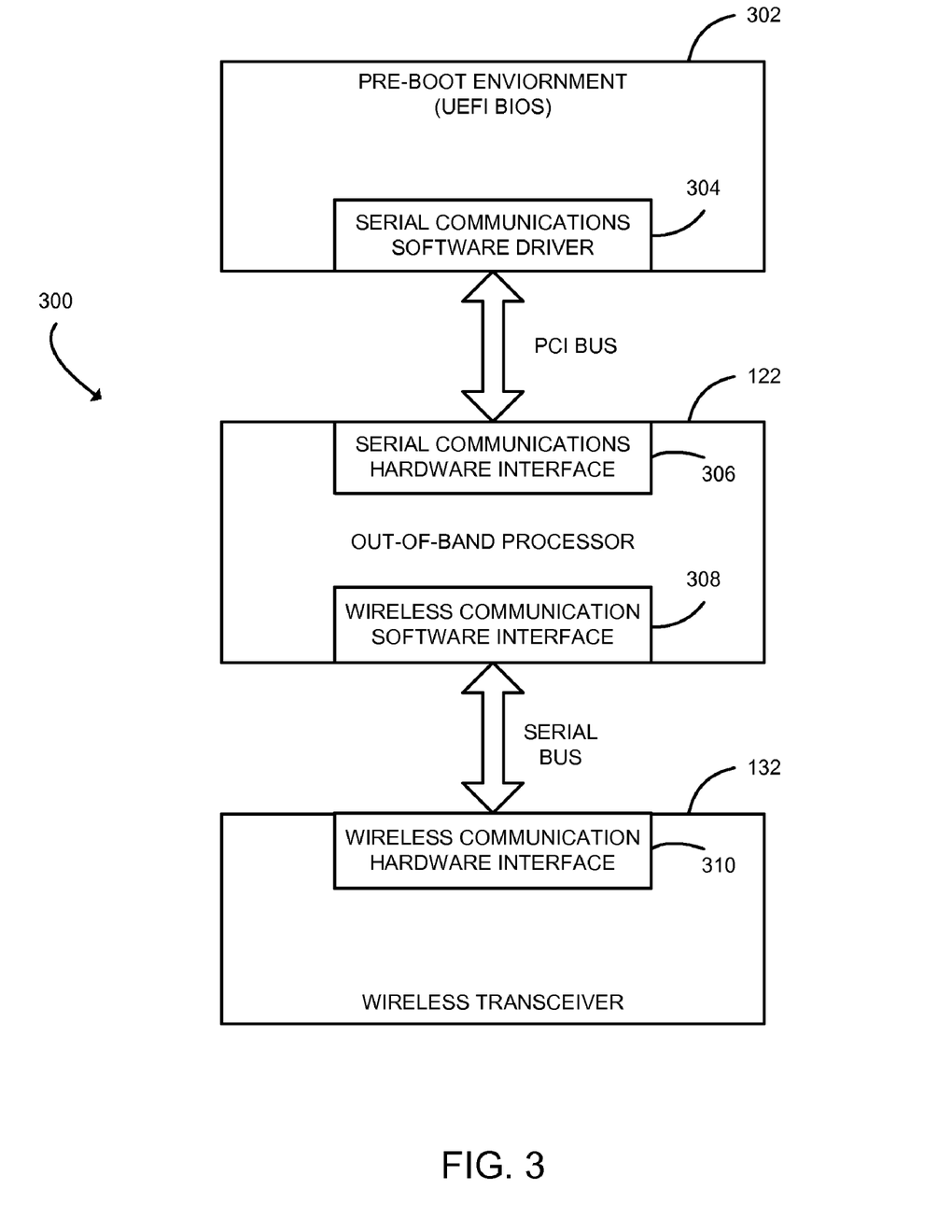
FIG. 3 is a simplified block diagram of a hardware and software environment of the computing device of FIG. 1.

However, if the computing device 102 determines that an OOB processor 122 having wireless connectivity is present and configured for wireless communication during a pre-boot phase, the method 200 advances to block 210. In block 210, a wireless communication interface 300 (see FIG. 3) is established between the UEFI 302 and the wireless transceiver 132. The wireless communication interface 300 may include software and/or hardware components. For example, as illustrated in FIG. 3, a serial communications driver 304 may be provided to or otherwise executed by the UEFI 302 to communicate data to and receive data from a serial communications hardware interface 306 of the OOB processor 122. In one particular embodiment, the serial communications hardware interface 306 is embodied as a universal asynchronous receiver/transmitter (UART) device and the UEFI 302 communicates with the interface 306 over a peripheral component interconnect (PCI) bus, but other devices and/or methodology may be used to transfer data between the UEFI 302 and the OOB processor 122.

The OOB processor 122 also includes a wireless communication software interface 308 to transfer data to and receive data from a wireless communication hardware interface 310 of the wireless transceiver 132. In one particular embodiment, the OOB processor 122 communicates with the wireless transceiver 132 over a serial bus, which may be embodied as a serial peripheral interface bus (SPI Bus), a controller link bus, or other specialized interconnect. As discussed in more detail below, the OOB processor 122 is configured to repackage or reformat wired communications data received from the UEFI 302, which is formatted according to a predetermined wired communications standard (e.g., IEEE 802.3), to a predetermined wireless communications standard format (e.g., IEEE 802.11). Similarly, the OOB processor 122 is also configured to repackage or reformat wireless communications data received from the wireless transceiver 132, which is formatted according to the predetermined wireless communications standard, to the predetermined wired communications standard.

Referring back to FIG. 2, after the wireless communication interface 300 is established in block 210, the computing device 102 continues the pre-boot initialization in block 212. During the pre-boot initialization, the computing device 102 determines whether any wireless communication transactions are requested or otherwise occur in block 214. If so, the computing device 102 determines whether pre-boot phase wireless communications have been enabled on the computing device 102 (e.g., see blocks 206, 208).

Figure 4:
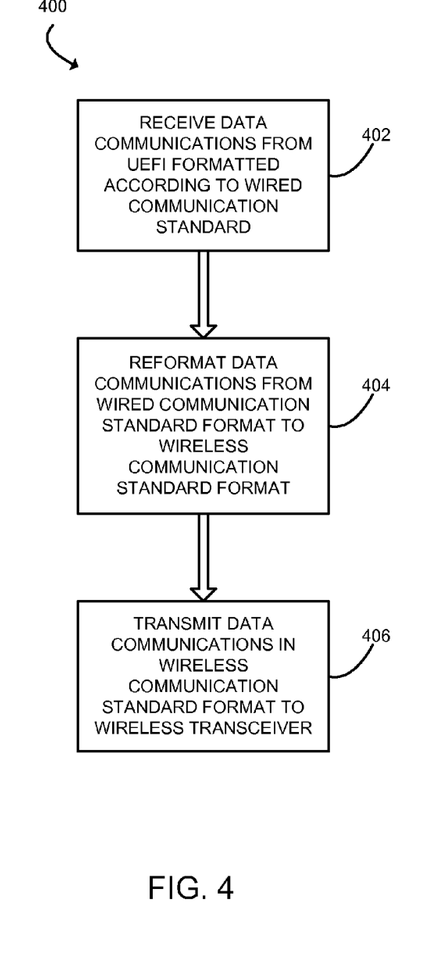
FIG. 4 is a simplified flow diagram of one embodiment of a method for processing communication data during a pre-boot phase of the computing device of FIG. 1.

If pre-boot phase wireless communications have been enabled on the computing device 102, the method 200 advances to block 216 in which OOB processor 122 processes data communications between the UEFI 302 and the wireless transceiver 132. For example, as illustrated in FIG. 4, the OOB processor 122 may execute a method 400 for processing data transmissions received from the UEFI 302. The method 400 begins with block 402 in which the OOB processor 122 receives data communications from the UEFI 302, which are formatted according to the predetermined wired communications standard. In block 404, the OOB processor 122 reformats or otherwise converts the communications data from the wired communications standard format to the predetermined wireless communications standard format. For example, the OOB processor 122 may use a standard methodology for converting the communications data such as the Internet Engineering Task Force (IETF) encapsulation standard defined by the RFC-1042 standard, published February 1988; the tunnel encapsulation standard defined by the IEEE 802.1H standard, published Aug. 12, 1997; or other conversion standard. The OOB processor 122 provides or otherwise transmits the communications data formatted according to the wireless communication standard format to the wireless transceiver 132 in block 406. The wireless transceiver 132 may then wirelessly transmit the communications data to the access point 104.

Figure 5:
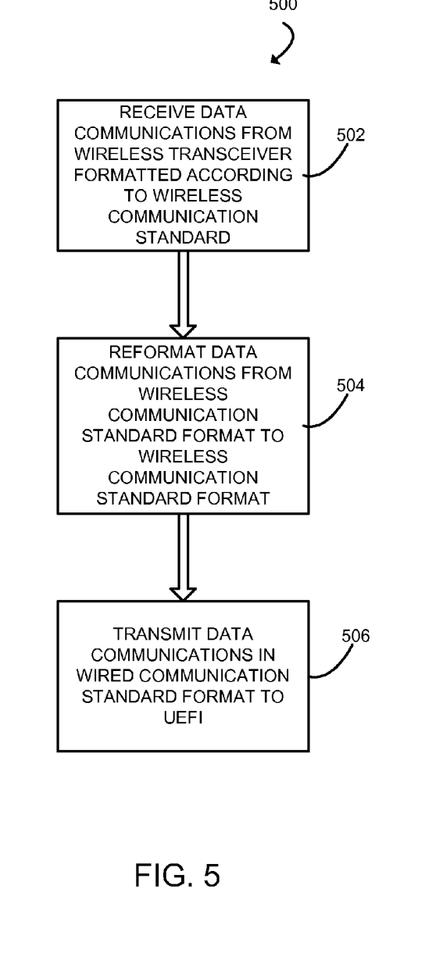
FIG. 5 is a simplified flow diagram of another embodiment of a method for processing communication data during a pre-boot phase of the computing device of FIG. 1.

Referring now to FIG. 5, the OOB processor 122 may also execute a method 500 for processing data transmissions received from the wireless transceiver 132. The method 500 begins with block 502 in which the OOB processor 122 receives data communications from the wireless transceiver 132, which are formatted according to the predetermined wireless communications standard. In block 504, the OOB processor 122 reformats or otherwise converts the communications data from the wireless communications standard format to the predetermined wired communications standard format. For example, as discussed above, the OOB processor 122 may use the IETF encapsulation standard defined by the RFC-1042 standard, published February 1988, or the tunnel encapsulation standard defined by the IEEE 802.1H standard, published Aug. 12, 1997; or other conversion standard. The OOB processor 122 provides or otherwise transmits the communications data formatted according to the wired communication standard format to the UEFI 302 in block 406. The UEFI 302 may then process the communications data and respond accordingly if required.

Referring back to FIG. 2, if no wireless transaction is requested or no pre-boot wireless communications is enabled, the method 200 advances to block 220 in which the computing device 102 determines whether the pre-boot phase is completed. If not, the method 200 loops back to block 214 in which the pre-boot initialization continues. However, if the pre-boot phase is completed, the method 200 advances to block 222 in which the wireless communication interface 300 established between the UEFI 302 and the wireless transceiver 132 is removed.

Figure 6:
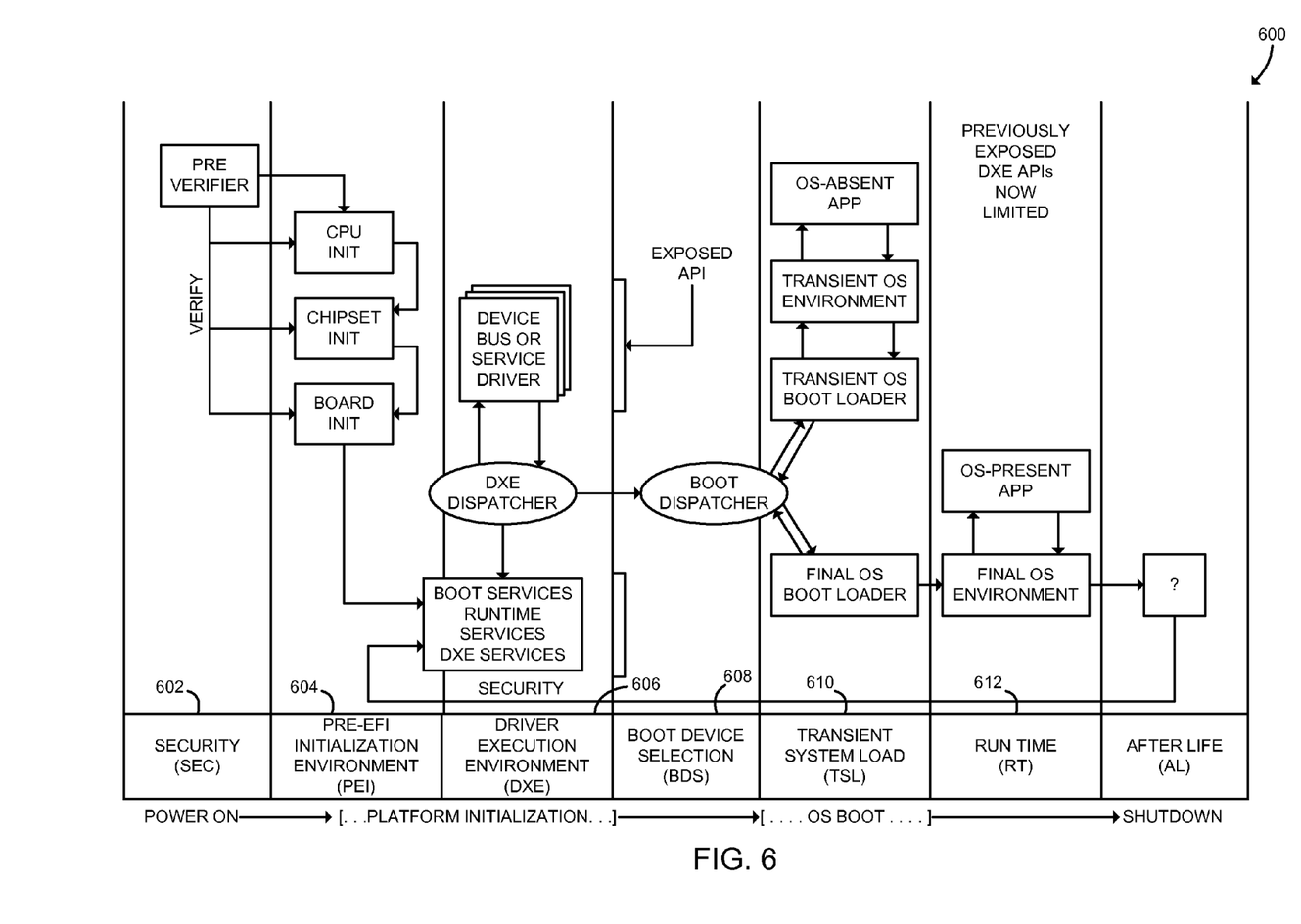
FIG. 6 is one embodiment of a simplified boot timeline of the computing device of FIG. 1.

As discussed above, the wireless communication interface 300 between the UEFI 302 and the wireless transceiver 132 is established during a pre-boot phase of the computing device 102. For example, an illustrative boot timeline 600 of the computing device 102 is illustrated in FIG. 6. The boot timeline 600 includes a plurality of boot phases. For example, when the computing device 102 is initially powered on or otherwise restarted, a security phase 602 is executed. Subsequently, a pre-EFI Initialization (PEI) Environment phase 604 is executed in which hardware devices of the platform of the computing device 102, such as the in-band processor 120, are initialized. Next, a driver execution environment (DXE) phase 606 is executed in which a plurality of device, bus, and/or service drivers are loaded and/or executed. In the illustrative embodiment, the wireless communication interface 300 between the UEFI 302 and the wireless transceiver 132 is established during or at the completion of the driver execution environment phase 606. For example, the UEFI 302 may load the serial communications software driver 304 to communicate with the OOB processor 122 during the driver execution environment phase 606. A Boot Device Selection (BDS) phase 608 is executed after the driver execution environment phase 606. Subsequently, a Transient System Load (TSL) phase 610 is executed in which an operating system loader is initiated. Additionally, the wireless communication interface 300 established between the UEFI 302 and the wireless transceiver 132 by the OOB processor 122 is removed during the TSL phase 610 and prior to the execution of the operating system in the Run Time (RT) phase 612.

While the disclosure has been illustrated and described in detail in the drawings and foregoing description, such an illustration and description is to be considered as exemplary and not restrictive in character, it being understood that only illustrative embodiments have been shown and described and that all changes and modifications that come within the spirit of the disclosure and the appended claims are desired to be protected.

The invention claimed is:

1. A method comprising:
   establishing a communications interface between a unified extensible firmware interface and a wireless transceiver of a computing device during a pre-boot phase of the computing device; and
   processing data communications between the unified extensible firmware interface and the wireless transceiver during the pre-boot phase using an out-of-band (OOB) processor of the computing device, wherein processing the data communications comprises:
   (i) receiving data communications formatted according to a wired communication standard from the unified extensible firmware interface,
   (ii) reformatting the data communications according to a wireless communication standard, and
   (iii) providing the data communications formatted according to the wireless communication standard to the wireless transceiver.

2. The method of claim 1, wherein establishing the communication interface comprises loading a universal asynchronous receiver/transmitter (UART) driver to facilitate serial communications between the unified extensible firmware and the OOB processor.

3. The method of claim 1, wherein establishing the communication interface comprises establishing the communications interface during a driver execution environment (DXE) phase of the pre-boot phase.

4. The method of claim 1, wherein processing data communications further comprises:
   receiving data communications formatted according to a wireless communication standard from the wireless transceiver;
   reformatting the data communications according to a wired communication standard; and
   providing the data communications formatted in the wired communication standard to the unified extensible firmware interface.

5. The method of claim 1, wherein receiving data communications comprises receiving the data communications from the unified extensible firmware interface with a serial hardware interface of the OOB processor.

6. The method of claim 5, wherein receiving the data communications comprises receiving the data communications over a peripheral component interconnect (PCI) bus with the OOB processor.

7. The method of claim 5, wherein receiving the data communications comprises receiving data communications from the unified extensible firmware interface with a universal asynchronous receiver/transmitter (UART) device of the OOB processor.

8. The method of claim 1, further comprising determining whether the computing device includes the wireless transceiver, and
   wherein establishing the communications interface comprises establishing the communications between the unified extensible firmware interface and the wireless transceiver in response to the computing device including the wireless transceiver.

9. The method of claim 1, further comprising removing the communication interface prior to the loading of an operating system on the computing device.

10. A non-transitory, machine readable medium comprising a plurality of instructions that, in response to being executed, result in a computing device:
    establishing a communications interface between a unified extensible firmware interface and a wireless transceiver during a pre-boot phase of the computing device; and
    processing data communications between the unified extensible firmware interface and the wireless transceiver during the pre-boot phase using an out-of-band (OOB) processor of the computing device, wherein processing the data communications comprises:
    (i) receiving data communications formatted according to a wired communication standard from the unified extensible firmware interface,
    (ii) reformatting the data communications according to a wireless communication standard, and
    (iii) providing the data communications formatted according to the wireless communication standard to the wireless transceiver.

11. The non-transitory, machine readable medium of claim 10, wherein establishing the communication interface comprises loading a universal asynchronous receiver/transmitter (UART) driver to facilitate serial communications between the unified extensible firmware and the OOB processor.

12. The non-transitory, machine readable medium of claim 10, wherein processing the data communications further comprises:
    receiving data communications formatted according to a wireless communication standard from the wireless transceiver;
    reformatting the data communications according to a wired communication standard; and
    providing the data communications formatted according to the wired communication standard to the unified extensible firmware interface.

13. The non-transitory, machine readable medium of claim 10, wherein receiving the data communications comprises receiving data communications from the unified extensible firmware interface with a serial interface of the OOB processor.

14. The non-transitory, machine readable medium of claim 10, wherein receiving the data communications comprises receiving the data communications over a peripheral component interconnect (PCI) bus with the OOB processor.

15. The non-transitory, machine readable medium of claim 14, wherein receiving the data communications comprises receiving data communications from the unified extensible firmware interface with a universal asynchronous receiver/transmitter (UART) device of the OOB processor.

16. A computing device comprising:
    an in-band processor;
    a wireless transceiver;
    an out-of-band (OOB) processor configured to communicate over a wireless network using the wireless communication circuit irrespective of an operating state of the in-band processor, the OOB processor to:
    establish a communications interface between a unified extensible firmware interface executed on the computing device and the wireless transceiver during a pre-boot phase of the in-band processor on the computing device; and
    process data communications between the unified extensible firmware interface and the wireless transceiver during the pre-boot phase, wherein to process the data communications comprises to:
    (i) receiving data communications formatted according to a wired communication standard from the unified extensible firmware interface,
    (ii) reformatting the data communications according to a wireless communication standard, and (iii) provide the data communications formatted according to the wireless communication standard to the wireless transceiver.

17. The computing device of claim 16, wherein to establish the communication interface comprises to load a universal asynchronous receiver/transmitter (UART) driver to facilitate serial communications between the unified extensible firmware and the OOB processor.

18. The computing device of claim 16, wherein to process the data communications further comprises to:

receive data communications formatted according to a wireless communication standard from the wireless transceiver;

reformat the data communications according to a wired communication standard; and provide the data communications formatted according to the wired communication standard to the unified extensible firmware interface.

* * * * *